INVENTORS.
ANTHONY M. GARCIA
LLOYD H. REDFORD
BY
Teare, Fetzer & Teare
ATTORNEYS.

INVENTORS.
ANTHONY M. GARCIA
LLOYD H. REDFORD
BY
Teare, Fetzer & Teare
ATTORNEYS.

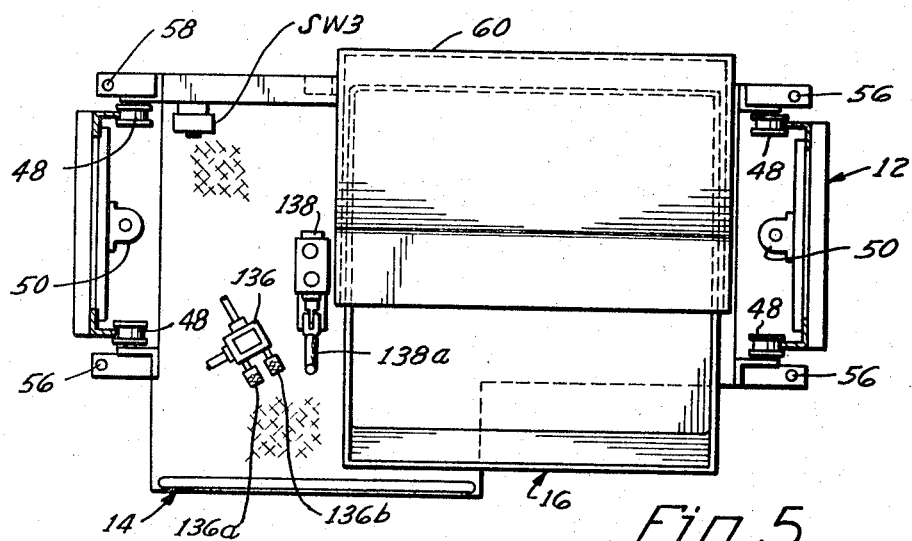
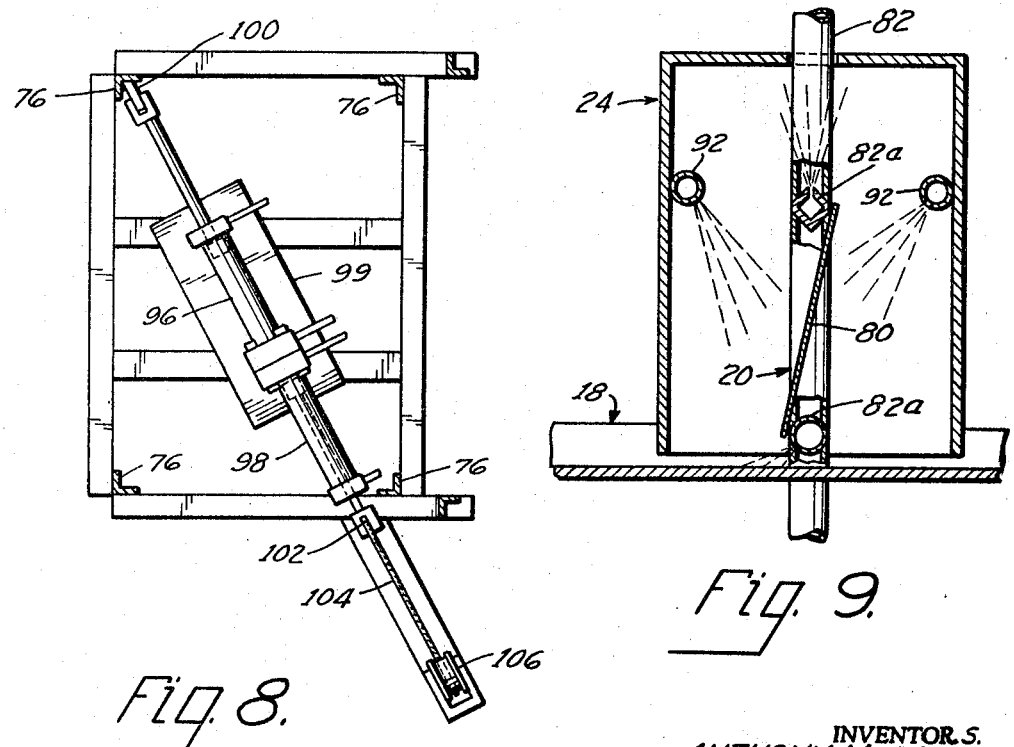

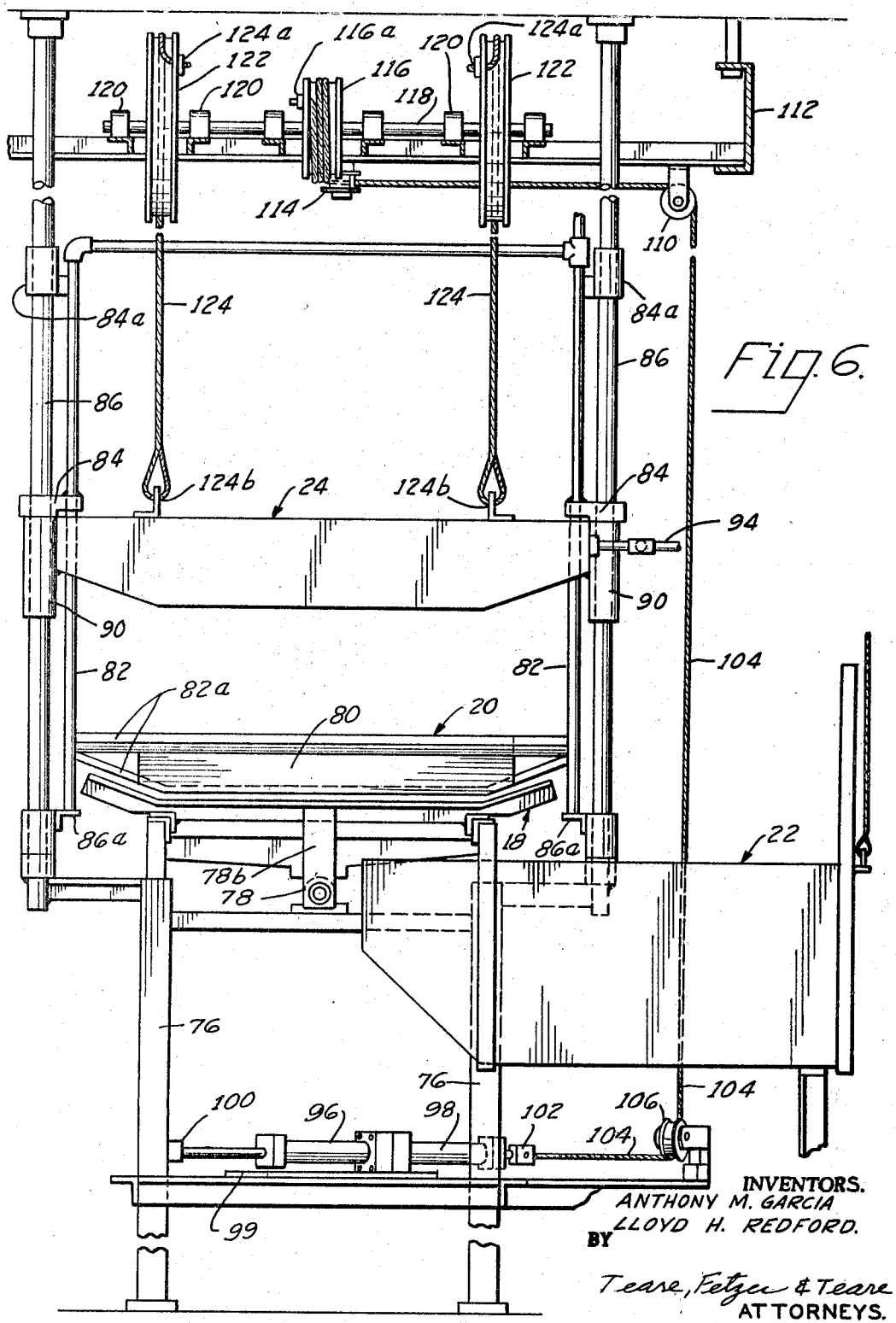

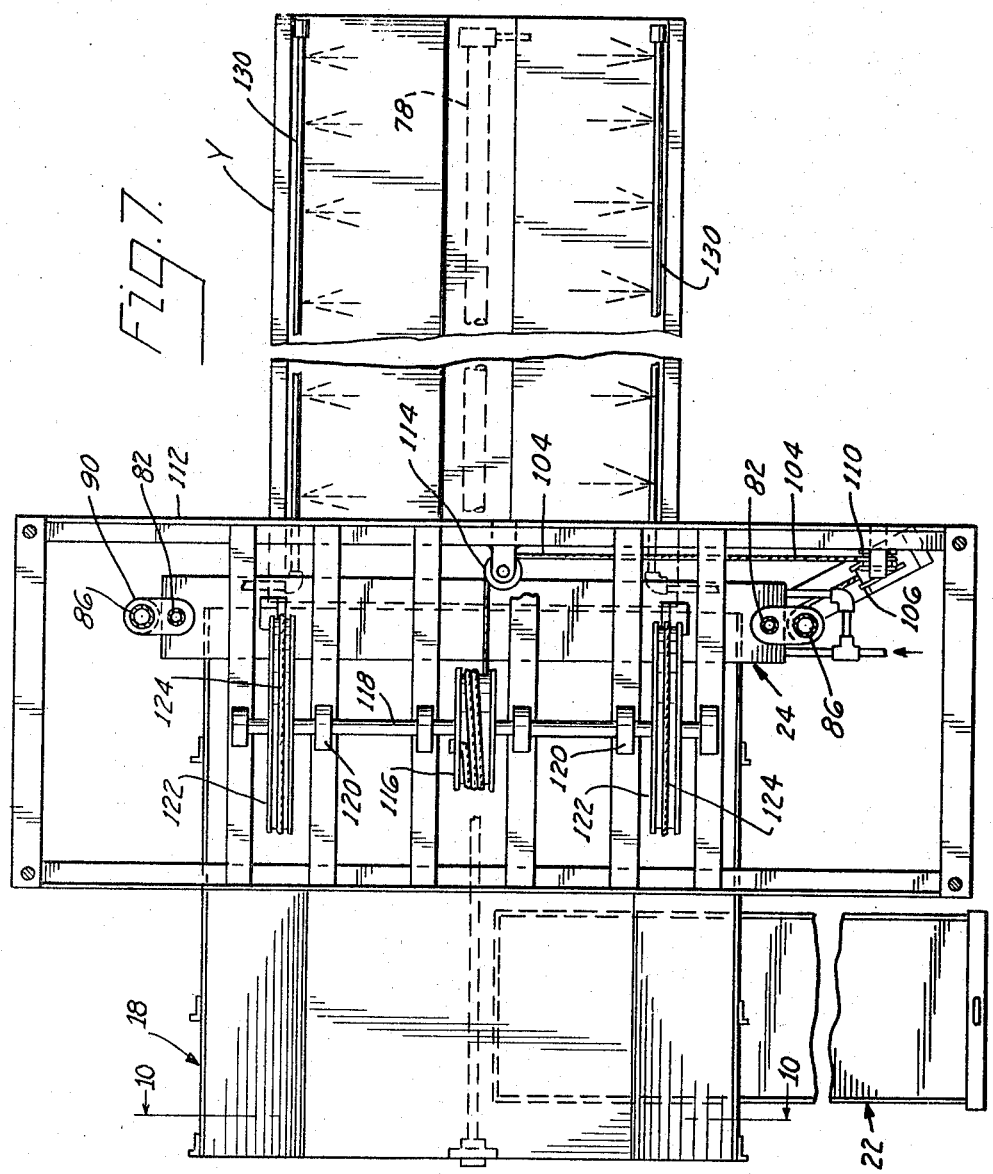

May 9, 1967     A. M. GARCIA ETAL     3,317,949
APPARATUS FOR DRESSING SLAUGHTERED ANIMALS
Filed April 12, 1965     9 Sheets-Sheet 8
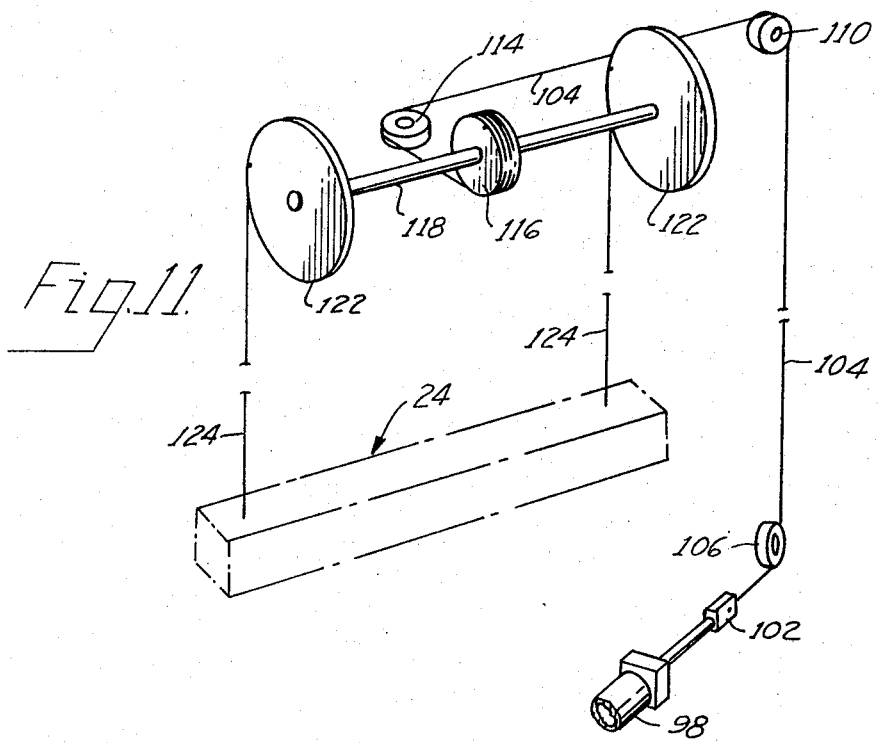
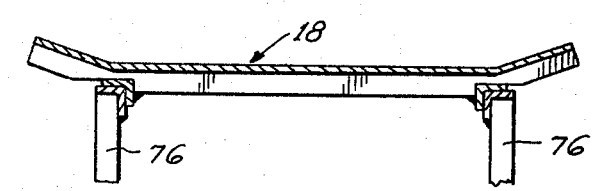
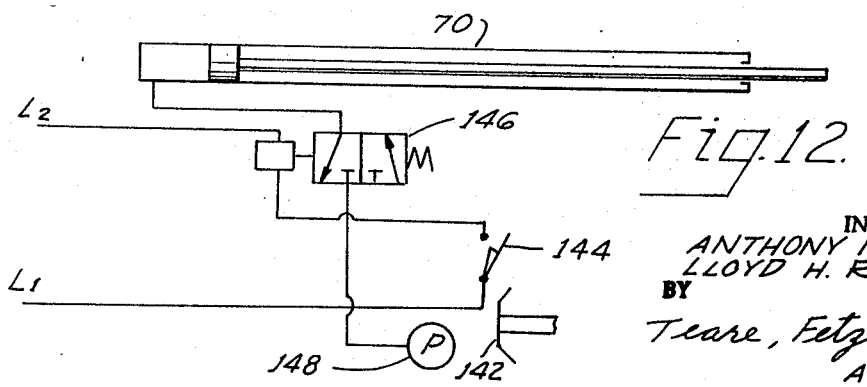
INVENTORS.
ANTHONY M. GARCIA
LLOYD H. REDFORD
BY
Teare, Fetzer & Teare
ATTORNEYS.

INVENTORS.
ANTHONY M. GARCIA
LLOYD H. REDFORD
BY Teare, Fetzer & Teare
ATTORNEYS.

United States Patent Office 3,317,949
Patented May 9, 1967

3,317,949
APPARATUS FOR DRESSING SLAUGHTERED
ANIMALS
Anthony M. Garcia and Lloyd H. Redford, Cleveland,
Ohio, assignors to Earl C. Gibbs, Inc., Cleveland, Ohio,
a corporation of Ohio
Filed Apr. 12, 1965, Ser. No. 447,283
19 Claims. (Cl. 17—24)

This invention relates in general to apparatus for expediting the dressing of slaughtered animals, and more particularly to a novel apparatus that is operable to greatly expedite the removal of the viscera from the slaughtered animal and for handling such viscera or gut in its subsequent inspection and other processing procedures.

In the meat packing industry today, there are generally two methods used for removal of the viscera from the slaughtered animals. One of these includes an arrangement wherein a gut wagon is disposed adjacent the carcass of the animal which is suspended on a hoist for raising or lowering the animal with respect to the wagon. Such an arrangement has been found to be inefficient not only in the removal of the viscera or organs from the animal into the gut wagon, but also the subsequent inspection of the viscera, and movement of the wagon to accomplish such inspection, and subsequent processing is a time consuming and inefficient operation.

Another method heretofore used has been the provision of a moving table positioned at a predetermined height above the floor of the plant adjacent the animals which are suspended from an overhead conveyor, and workmen stand on the table and drop the viscera onto the table as the table moves along with the animal. Due to the different sizes of animals that are slaughtered and the fact that the table becomes wet and slick, an efficient job of eviscerating is not possible.

The present invention provides a novel mechanism which includes a work platform on which a workman can stand for accomplishing the eviscerating operation and with there being provided means for adjusting the elevation of the platform with respect to ground level. The mechanism may also include means for moving the platform with the movement of the slaughtered animals which may be suspended on an overhead conveyor means, and means for moving the platform transversely of the animals' movement. A movable receptacle may be provided on the platform for receiving the organs or viscera from the animal, and upon actuation of suitable controls, the receptacle may be moved to a discharge position wherein the viscera is deposited on a receiving means such as a table or an endless belt, where inspection of the viscera may occur. If the viscera passes inspection, a gate mechanism on the receiving means is raised and the receiving means may be moved to a discharging position where the viscera can be removed for further processing, and then the receiving means moves back to receiving position, while at the same time means is provided for sterilizing and washing the table as it moves back to its receiving position ready for receiving thereon another load of viscera. However, if the viscera, after inspection, is rejected due to for instance disease, the receiving means is adapted to move through the gate mechanism which is maintained in down position, and as the receiving means moves to discharge position, the condemned viscera is adapted to be moved into a condemned chute for disposal thereof. During movement of the receiving means to discharge position and back to receiving position, such means may be flushed and sterilized by suitable means such as by hot and cold fluids, or by germicidal lamp means.

Accordingly, an object of the invention is to provide a novel mechanism for use in dressing slaughtered animals.

Another object of the invention is to provide a novel mechanism for dressing slaughtered animals which includes a trolley movable with the animals which are adapted to be suspended from an overhead carrying or conveying means, and with the trolley incorporating a carriage which is movable or reciprocal transversely of the trolley movement, and with the carriage having a work platform thereon which is movable vertically with respect to the carriage, so that the workman can expeditiously position themselves with respect to the carcass of the animal, for efficiently carrying on eviscerating operations.

Another object of the invention is to provide a mechanism of the latter mentioned type which includes means for moving the removed viscera or organs onto a receiving platform where inspection of the viscera can occur, and means for either moving the viscera to a discharge station for further processing if the viscera passes inspection, or for moving the viscera to a condemned station if it does not pass inspection, together with means for sterilizing the receiving platform after each viscera load is inspected thereon.

Other objects and advantages of the invention will be apparent from the following description taken in conjunction with the accompanying drawings wherein:

FIG. 5 is a sectional view taken generally along the plane of line 5—5 of FIG. 2 looking in the direction of the arrows, and illustrating the work platform and the viscera pan which receives the viscera therein, and the associated sterilizing hood for the pan;

FIG. 6 is an enlarged, sectional, partially broken view taken generally along the plane of line 6—6 of FIG. 1 looking in the direction of the arrows and illustrating the receiving platform, the gate and sterilizing cover therefor, and the mechanism for controlling the movement of the gate and cover;

FIG. 7 is an enlarged top plan view of the receiving table or platform onto which the viscera is discharged from the viscera pan on the work platform and illustrating the mechanism for controlling the movement of the gate and sterilizing cover of the receiving table;

FIG. 8 is an enlarged plan view taken generally along the plane of line 8—8 of FIG. 1 looking in the direction of the arrows, and showing the motor mechanism for operating the gate and the associated sterilizing cover;

FIG. 9 is an enlarged, vertical sectional view taken through the sterilizing cover and gate and showing the sterilizing spray means associated therewith;

FIG. 10 is a vertical sectional view generally along the plane of line 10—10 of FIG. 7, looking in the direction of the arrows;

FIG. 11 is a diagrammatic illustration of the mechanism for raising the sterilizing cover of the gate on the receiving table;

FIG. 12 is a diagrammatic illustration of a system for moving the trolley of the eviscerating mechanism back to its starting position, after accomplishment of the eviscerating operation;

Figure 1:
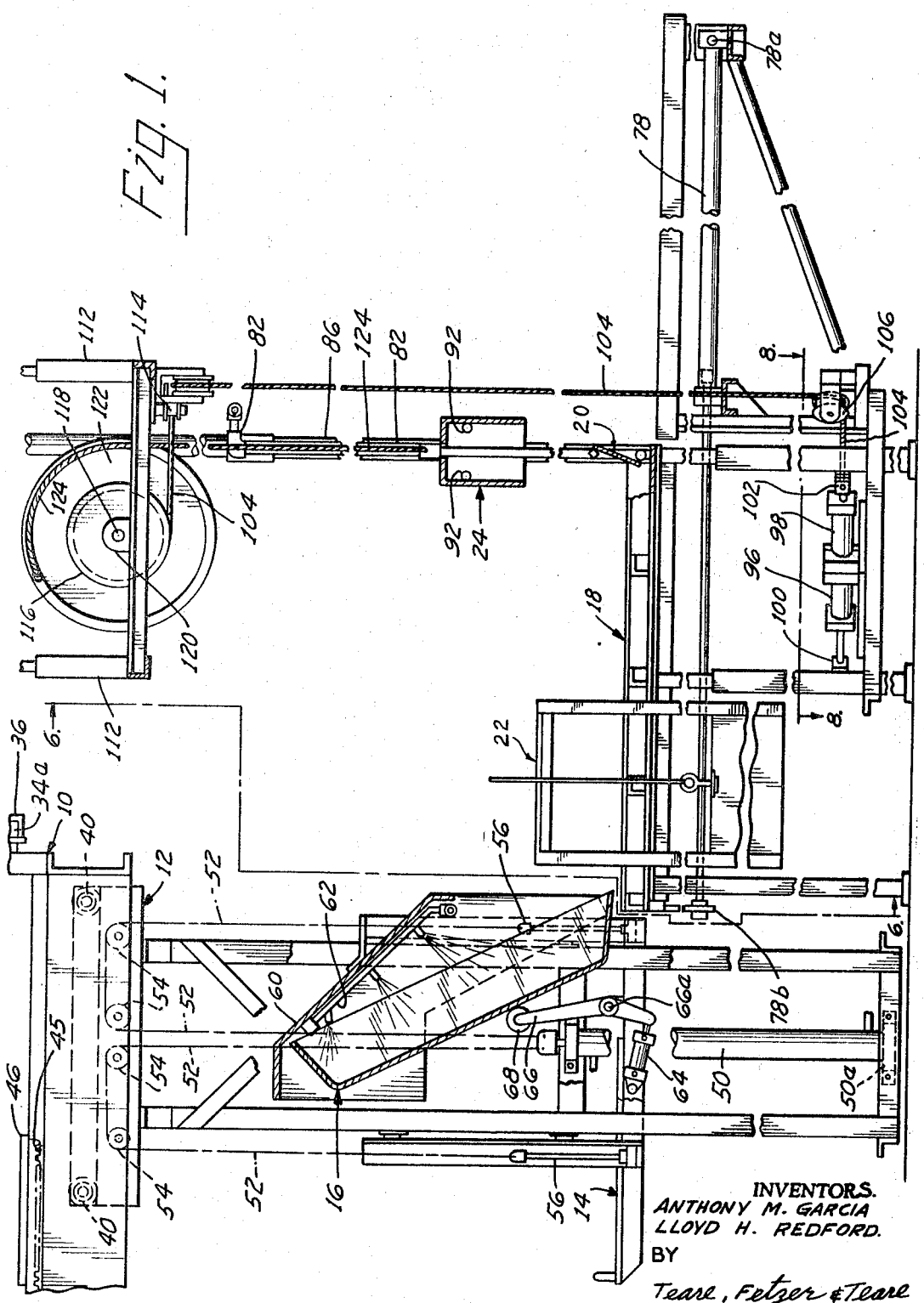
FIG. 1 is a partially broken, and partially sectioned side elevational view of the mechanism of the invention, and showing the receiving pan for the viscera on the work platform in a discharging position, for movement of the viscera onto the receiving platform or table for inspection thereof.

Referring now again to the drawings, the apparatus may comprise a trolley 10 which is movable with the carcass of the animal on which the eviscerating operation is to be accomplished, a carriage 12 supported by the trolley 10 and adapted for movement transversely thereof, a work platform 14 mounted on the carriage 12 and adapted for movement in a generally vertical plane with respect to the carriage 12, a receptacle or pan 16 carried by the platform 14 and adapted for receiving the viscera therein from the animal, a receiving means or table 18 adapted in the embodiment illustrated for reciprocal movement in a generally horizontal plane and adapted to receive the viscera thereon from the receptacle 16, a gate mechanism 20 which is adapted to be disposed in lowered position until inspection of the viscera is accomplished on the receiving table 18, a raisable sterilizing cover mechanism 24, and a condemned chute 22 for disposal of condemned viscera from the table 18.

Figure 2:
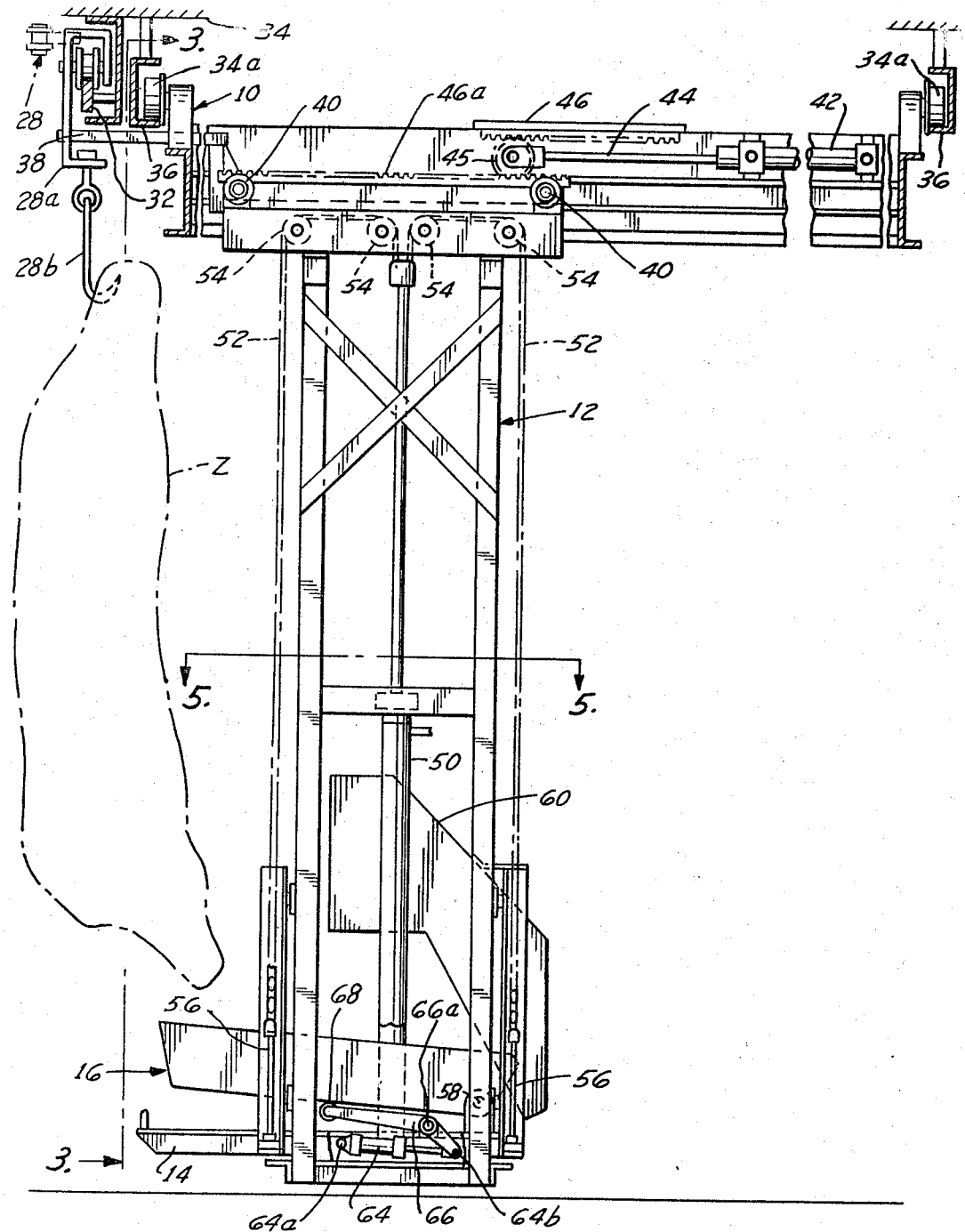
FIG. 2 is a side elevational partially broken, fragmentary view of the trolley and associated movable carriage and work platform, and its relationship to an animal carcass, for effective removal of the viscera from the carcass and into the viscera pan or tray; in this view the work platform is shown in its generally lowermost position.

Referring now in particular to FIG. 2, the carcass Z of the animal may be moved or transferred along by means of a powered endless conveyor system 28 of generally conventional type and which may include shackles 28a to which are coupled the hooks 28b which may extend through each of the rear legs of the suspended animal in the conventional manner. It will be understood however, that the invention is usable with any suitable conveyor system including intermittant and gravity systems. Straps 28a may each be mounted on a rotatable roller 30, which in turn runs on a track 32 suspended from an overhead support 34, and in the conventional manner.

Figure 3:
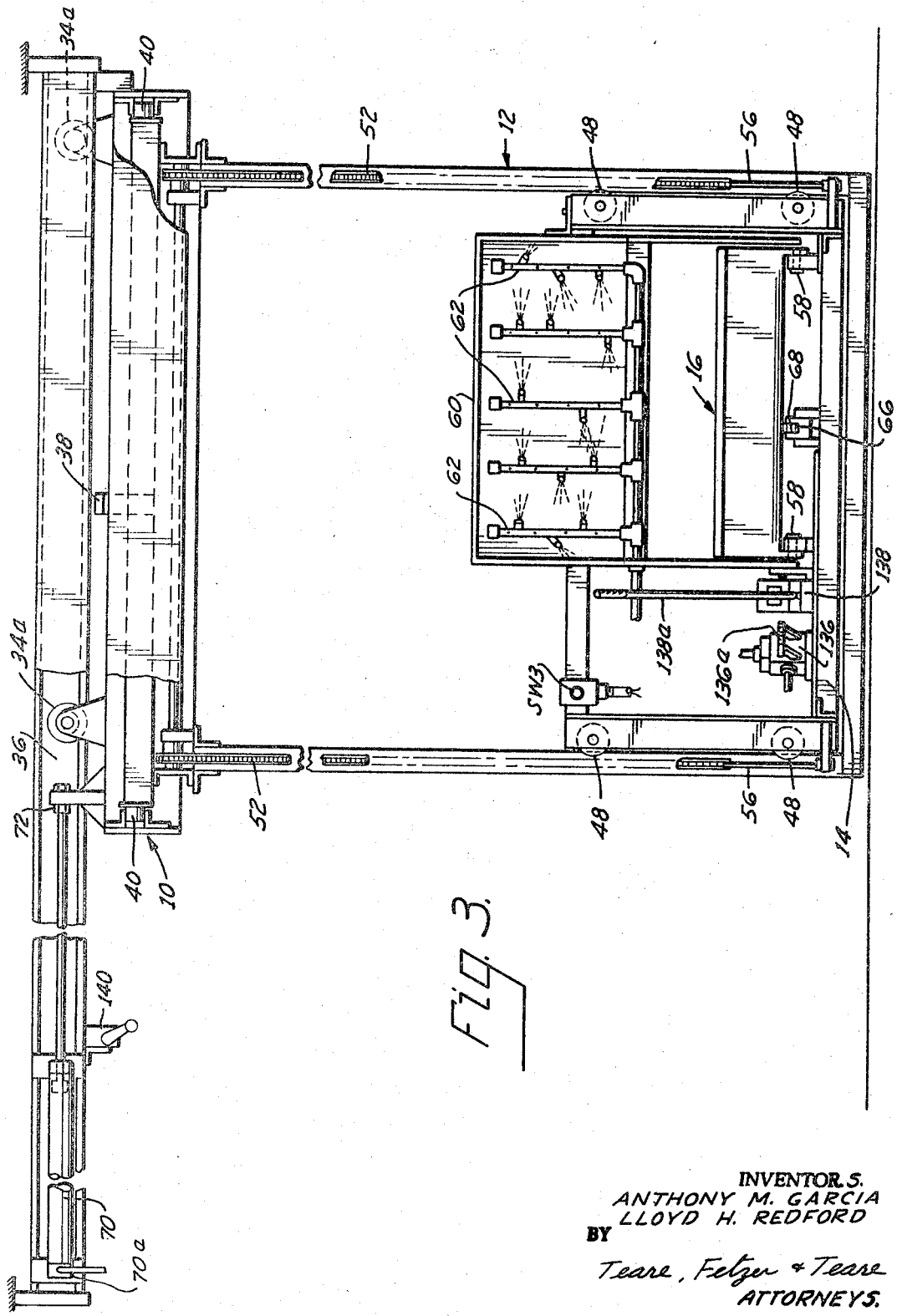
FIG. 3 is a sectional view taken generally along the plane of line 3—3 of FIG. 2 looking in the direction of the arrows.

The aforementioned trolley mechanism 10 may be provided with rollers 34a (FIGS. 2 and 3) which may run in overhead tracks 36, for movement of the trolley lengthwise with movement of the carcass Z.

Suspended from the trolley frame 10 is the aforementioned carriage structure 12. Carriage 12 may be mounted on the trolley frame 10 by means of rollers 40 (FIGS. 2 and 4) movable in tracks 40a on the trolley frame, which enables movement of the carriage 12 transversely of the trolley frame 10. Carriage 12 has a tongue or rod 38 projecting laterally therefrom and which rod 38 may project laterally of the trolley frame upon predetermined movement of the carriage 12 toward the carcass Z. Rod 38 is adapted for engagement with one of the straps 28a of the carcass conveyor system 28, and thus will cause movement of the trolley 10 and associated carriage 12 and platform 14, along trolley tracks 36, and in coupled relation to the conveyor system 28. It will be seen that upon predetermined withdrawal movement (with reference to FIG. 4) of the carriage 12 with respect to the carcass conveyor 28, the tongue 38 will become disengaged from coaction with the carcass conveyor, and the trolley 10 will then not be moved with the carcass conveyor.

In order to provide for such transverse movement of the carriage 12 with respect to the trolley 10, there may be provided a fluid powered, reciprocal, double acting motor unit 42 (FIGS. 2 and 4) supported on the trolley frame 10, and coacting with the carriage 12, for so moving the carriage. The piston rod 44 of motor unit 42 may be provided with a rotatable gear 45 which may coact between a stationary rack 46 secured to the trolley frame, and a rack 46a secured to the carriage frame 12. With such an arrangement, the movement of the carriage will be twice the stroke or movement of the motor unit 42, thus enabling the use of a relatively small size motor unit.

Mounted on the carriage frame 12 is the aforementioned work platform 14 on which a workman may stand in generally facing relation to the underside of the carcass during the eviscerating operation on the carcass. Such platform 14 is mounted for movement in a generally vertical plane with respect to the carriage 12 and as by means of flanged wheels 48, and in this connection, there may be provided reciprocal fluid powered, double acting motor units 50 on opposite sides of the platform 14, each of which motor units may be anchored at one end thereof, and as at 50a (FIG. 1) to the carriage 12, and at the other end thereof to flexible means such as link chains 52, which may be trained about rotatable sprockets 54 mounted on the carriage 12. The other end of the flexible means 52 may be anchored as at 56 to the platform 14. It will be seen therefore that upon extension of the motor units 50, the platform 14 will be lowered with respect to the carriage frame 12 and upon retraction of the motor units 50, the platform 14 will be raised.

Pivoted as at 58 to the platform 14 for movement in a generally vertical plane may be the aforementioned viscera receiving trough or pan 16. Associated with the pan 16 may be a sterilizing hood 60 (FIGS. 1, 2 and 3) into which the pan is adapted to move when it is pivoted to an upended position for discharge of the viscera therein, and as shown in FIG. 1.

Mounted in the hood 60 may be a series of elongated, laterally spaced spraying pipes 62 which are adapted for connection to a source of hot or boiling water, so that the pan 16 can be washed down and sterilized after it discharges its load of viscera onto the receiving table 18. As can be seen from FIG. 1, in the dumping position of the pan 16, the spraying pipes 62 direct the hot scalding water into the pan and wash any residue therein down onto the table 18, thereby sterilizing and cleaning the pan 16.

Pan 16 may be moved to dumping or unloading position by means of motor unit 64 (FIGS. 1 and 2) pivoted as at 64a to the platform 14, and pivoted at its other end as at 64b to crank lever 66, which may be pivoted as at 66a to the platform 14. The distal end of the lever 66 may be provided with a roller 68 for facilitating the pumping of the pan 16 by the lever 66.

In order to move the trolley frame 10 and associated carriage 12 and work platform 14, back along the trolley tracks 36, after such mechanism has been moved forwardly by the coaction between the tongue 38 and the conveyor mechanism 28, there may be provided a single acting fluid powered motor unit 70 (FIGS. 3, 4 and 12) coupled at one end to the overhead tracks 36, and at the other end, and as at 72, to the trolley frame 10. Operation of this motor unit and its coaction with the trolley frame will be hereinafter described in detail.

The receiving means or table 18 which is adapted to receive the viscera upon dumping of the viscera pan 16, may be of a generally trough shaped configuration in transverse section as can be best seen in FIG. 10. Table 18 may be either solid or slatted and may be mounted for reciprocal sliding movement on support structure 76 (FIGS. 6 and 10). Receiving means 18 could also be in the form of a continuously movable table (i.e. an endless belt) of either solid or slatted construction. A reciprocal double acting, fluid powered motor unit 78 (FIG. 1) may be coupled as at 78a to a support, and coupled as at 78b to the table 18, for reciprocating the table in a generally horizontal plane.

Associated with platform 18 is the aforementioned gate mechanism 20 which is adapted to remain in a down position until the viscera has been inspected, as for instance at station X (FIG. 1). Such gate may comprise a plate-like member 80 (FIGS. 1 and 9) mounted on a frame work 82 (FIG. 6) which frame work serves as conduit means for carrying hot scalding water to the gate 80 for sterilizing and cleaning the table 18. As can be best seen in FIGS. 6 and 9 of the drawings, the hot water is adapted to pass through the transversely extending members 82a of the frame work 80, and to pass through spray openings therein. Frame work 82 and the associated gate plate 80 are mounted for vertical movement, as by means of collars 84, 84a secured to the frame work 82 and slideable along vertical guides 86. Stops 86a (FIG. 6) may be provided for limiting the downward movement of the frame work 82 and associated gate 80.

Also mounted for vertical movement on upright guides 86 may be the aforementioned sterilizing cover member 24, which when in a lowered position encompasses the gate mechanism 20 (FIG. 9) and aids in cleaning and sterilizing the table 18. Cover 24 may be guided in its vertical movement along uprights 86 by means of collars 90 secured to the cover 24. Cover 24 preferably has spraying means 92 associated therewith or mounted thereon, as shown in FIG. 9, for spraying preferably cold water on opposite sides of the gate plate 80. Spraying means 92 may be coupled to a source of cold water by means of a flexible conduit 94 (FIG. 6) to provide for the movement of the cover 24 with respect to the source.

In order to accomplish vertical movement of the gate mechanism 20 and cover 24 with respect to the receiving table 18, there may be provided a pair of double acting, fluid powered motor units 96, 98 (FIGS. 6 and 8) which motor units 96, 98 may be connected together at the base ends thereof as shown in FIGS. 6 and 8. Motor units 96, 98 may be mounted on and are adapted for sliding movement with respect to plate 99. One of the motor units (e.g. 96) may be coupled or secured as at 100 (FIG. 8) to the frame work 76, while the other motor unit (e.g. 98) may be coupled as at 102 to flexible means, such as for instance a cable 104. Cable 104 may be trained about idler pulley 106 rotatably mounted on bracket 108, and then may be strung upwardly about idler pulley 110 rotatably mounted on overhead support structure 112, and then may be strung about pulley 114 to be wrapped about drum 116 and anchored thereto as at 116a. Drum 116 may be secured to a shaft 118 rotatably mounted in bearings 120. Also secured to shaft 118 on opposite sides of drum 116 are drums 122. Drums 122 have flexible means such as cables 124 secured thereto as at 124a, and secured as at 124b to the cover member 24. In the embodiment illustrated, the diameter of each of drums 122 is approximately twice the diameter of drum 116.

The cover 24 is shown in a raised position in FIG. 6, and in order to lower the cover from such position, motor unit 98 would be actuated to extend the piston rod thereof, thereby permitting clockwise rotation (as viewed in FIG. 1) of drum 116 and drums 122, which, due to the weight of the cover 24, causes lowering of the cover down along guides 86, and into the position illustrated in FIG. 9. Retraction of the piston rod of motor unit 98 from extended position will cause rotation of the drum 116 and drums 122 in a counter-clockwise direction (as viewed in FIG. 1) to cause reeving up of the cables 124 about drums 122 and thus raising of the cover 24.

Now in order to raise and lower the gate mechanism 20 after the viscera on the table 18 has passed inspection at station X, actuation of motor unit 96 may be accomplished, and it will be seen that upon retraction of the piston rod of motor unit 96 from the position illustrated in FIG. 6, which illustrates the raised position of the cover 24, a tension will be applied to the cable 104 to thus cause counter-clockwise rotation of drums 116 and 122, which will cause pulling up or raising of the cover 24 further upwardly from the elevated position of the cover shown in FIG. 6. It will be seen that the guides or sleeves 90 secured to the cover 24, are in engagement with the guides 84 secured to the gate frame 82 and associated gate plate 80, thus raising the gate mechanism with respect to the receiving table 18.

It will be seen that due to the approximately 2:1 ratio of the size of the drums or sheaves 122 with respect to drum 116, that relatively short stroke motor units can be used for moving cover 24 and the gate mechanism 20, with the linear movement of the respective motor unit being increased by the differential size between the drums 116, 122.

When the gate mechanism 20 is in raised position, and the motor unit 78 is actuated so as to move the receiving table in a direction lengthwise toward the right (as viewed in FIG. 1) the viscera on the receiving table passes beneath the gate plate 80 and to the discharge station Y. There may be provided generally horizontally disposed spraying means 130 (FIG. 7) disposed above the level of the table 18, for spraying the table and viscera thereon with warm water, when the table is disposed in discharge position.

Figure 4:
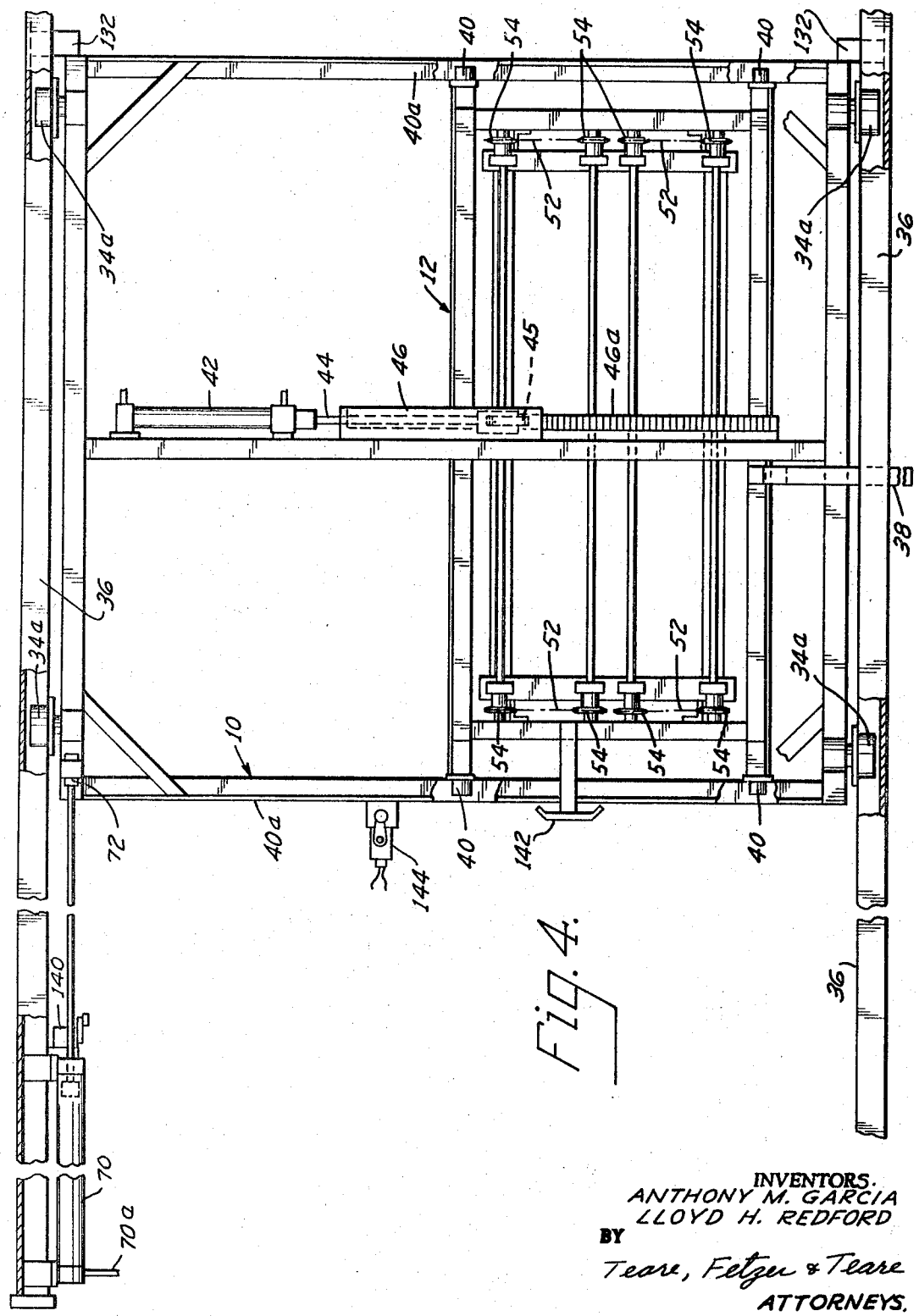
FIG. 4 is a partially broken, top plan view of the trolley frame and associated carriage.

Operation of the mechanism may be as follows: Referring to FIG. 4, when the trolley frame 10 is in its starting position, the frame 10 is in abutting engagement with stops 132. The work platform 14 is raised or lowered to the desired position with respect to the carriage frame 14 so as to suit the particular size of animal that is going to be eviscerated, and to suit the particular desires of the operator, and as for instance by actuating the motor units 50. Thereupon, the operator may move the carriage 12 transversely of the trolley frame 10 by actuation of motor unit 42, and until the tongue or rod 38 on the carriage frame 12 engages the carcass conveyor mechanism 28, to thereby cause movement of the trolley frame 10 and associated carriage 12 and work platform 14 with movement of the conveyor 28. As trolley 10 and platform 14 are moved along with the carcass Z, the operator removes the organs or viscera from the carcass and causes such viscera to drop into the pan 16 which is disposed in a substantially horizontal position during the eviscerating operation.

Figure 13:
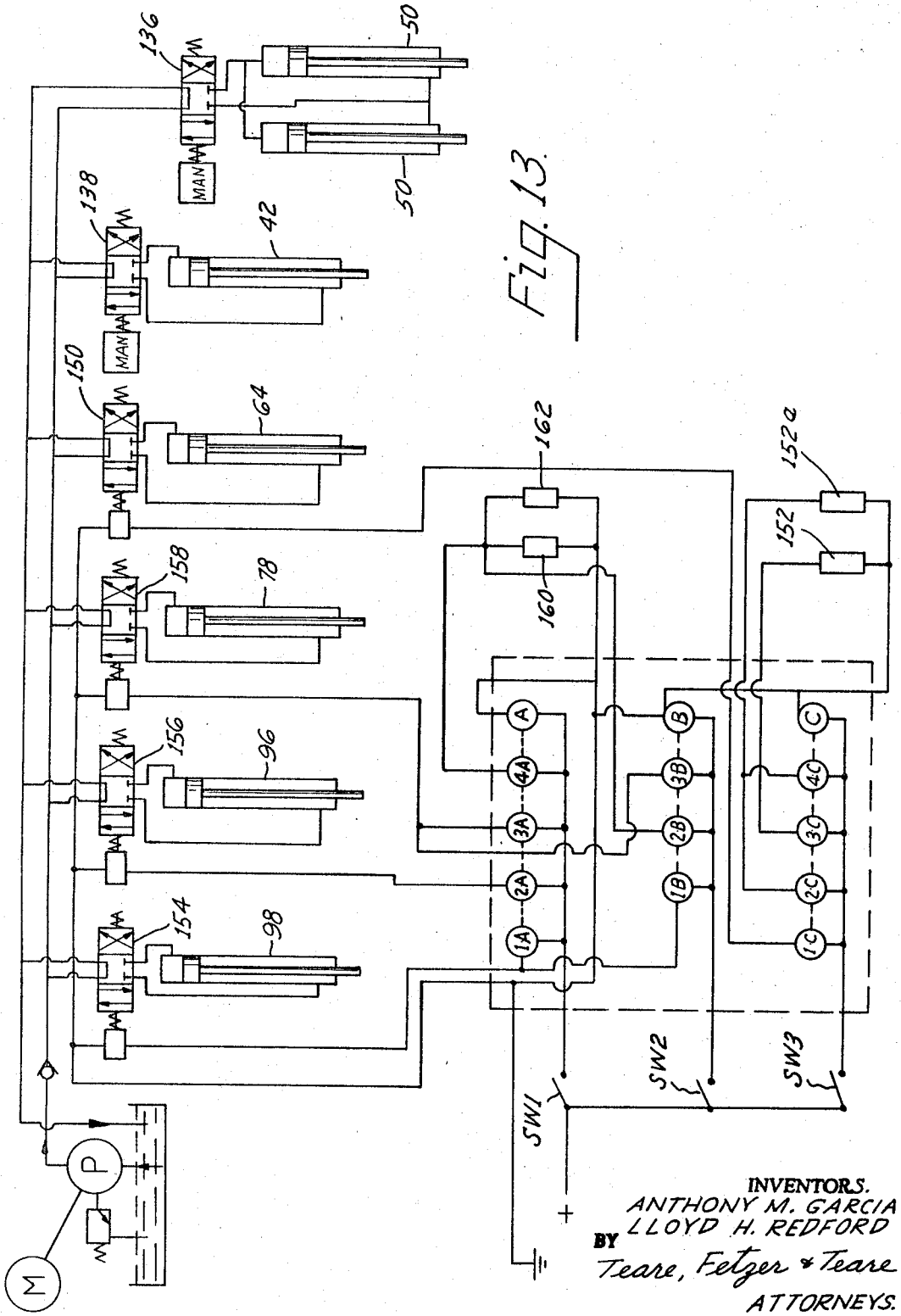
FIG. 13 is a schematic and diagrammatic illustration of a control system which may be utilized to control the various components of the mechanism.

The operator can conveniently move the platform 14 up or down with respect to the carriage 12 during the eviscerating of the animal. In this connection, there may be provided a foot operated valve 136 (FIG. 5) mounted on the platform 14, for convenient access by the operator. One pedal 136a of valve 136, may control movement of the cylinders 50 for causing upward movement of the platform with respect to the carriage, while actuation of the other pedal 136b of the valve 136, may cause downward movement of the work platform with respect to the carriage 12. The control for controlling the actuation of the motor unit 42, for causing transverse movement of the carriage 12 with respect to the trolley 10, may also be located on the platform and may constitute, for instance, the hand operated valve 138 having a control handle 138a (FIGS. 5 and 13). As evisceration progresses, the operator generally lowers the platform 14 so that he can remain in a comfortable position while the viscera is sliding into the viscera pan 16.

Now in the event that the operator does not finish the evisceration before the trolley frame 10 comes to the end of its extent of movement on its rails 36, there may be provided a limit switch 140 which is normally in a closed position and which is coupled into the circuit of the motor (not shown) which drives the carcass conveyor mechanism 28, so that when the trolley frame moves sufficiently towards the left (with reference to FIG. 4) so as to cause engagement of the trolley frame with the actuator of limit switch 140, the switch is opened and the motor for the conveyor system 28 is cut off, thereby stopping the entire conveyor system and accordingly stopping the movement of the trolley frame with the conveyor system. Thus, such limit switch 140 is operable to de-energize the carcass conveyor system 28 if the evisceration is not completed during the maximum distance of travel of the trolley frame 10.

Upon completion of the evisceration operation, the operator may actuate the lever 138a of valve 138 (FIG. 5) thus actuating the motor unit 42, and causing withdrawal of the tongue or rod 38 on carriage 12 from coaction with the conveyor mechanism 28. Upon withdrawal movement of the carriage frame 12 from coaction with the carcass conveyor 28, a cam (FIG. 4) projecting laterally from the carriage frame 12, engages a normally open limit switch 144 mounted on the trolley frame 10 (FIGS. 4 and 12), which closure of switch 144 causes actuation of conventional solenoid valve 146 and coupling of the motor unit 70, which in the embodiment illustrated is a pneumatic motor unit, to a source 148 of air pressure of the air system, thus driving the piston rod of motor unit 70 outwardly and moving the trolley frame back toward the right (as viewed in FIG. 4) and into engagement with the stops 132. The valve 146 may have an adjustable pressure relief section for exhausting to atmosphere excess pressure therein. Upon movement of the trolley frame 10 away from the limit switch 140, the carcass conveyor mechanism 28 automatically restarts.

If, of course, the evisceration is completed before the trolley frame 10 engages with limit switch 140, then the operator by actuating valve 138 so as to move the carriage and associated tongue 38 from coaction with the conveyor chain, causes actuation of the motor unit 70 due to the closing of switch 144, and thus moves the trolley frame 10 and associated carriage and platform 14 back to its starting position, or in other words into engagement with the stops 132.

After completion of the evisceration and when the trolley frame 10 is in engagement with the stops 132 and the carriage frame 12 is in its maximum retracted position with respect to the carcass conveyor mechanism 28, and the platform 14 is in its raised position (FIG. 1) the mechanism is ready for discharging the viscera from the pan 16 onto the receiving table 18.

The operator may then manually actuate switch SW-3 (FIGS. 5 and 13) thus actuating or energizing the timer motor C which actuates timer switch 1-C. Actuation of timer switch 1-C causes energization of the solenoid valve 150 which controls the actuation of the preferably hydraulic motor unit 64, which in turn controls the tipping of the viscera pan 16. Tipping of the pan to the position illustrated in FIG. 1 of the drawings causes discharge of the viscera onto the receiving table 18. The viscera pan 16 remains in its discharging position or in other words in the upwardly pivoted position, while the operator is operating the control valve 138 and the control valve 136 for returning the carriage and associated platform 14 to starting position for another eviscerating operation. During the return of the carriage and platform 14 to starting position, the timer switches 2-C, 3-C, and 4-C actuate hot and cold solenoid valves 152 and 152a, to apply first a cold and then a hot and then a second cold flush to the pan 16, and via the spraying tubes 62, thus sterilizing and cleaning the pan for receipt of the viscera from a further eviscerating operation. Once the operator actuates SW-3 and thus energizes the timer motor C, the discharge of the viscera from the pan 16, the flushing sterilization, and return of the pan to its receiving or horizontal position, is automatic so that the operator cannot lower the pan 16 to its receiving position until this cycle is completed. However, the operator may move the carriage and associated work platform 14 to its starting position ready to perform an eviscerating operation on another carcass, during this cleansing and lowering of the viscera pan 16.

Accordingly, the viscera is then disposed on the receiving table 18, and an inspection of the viscera may occur (FIG. 1) for checking the viscera for disease, etc. After the viscera inspection is completed, and assuming that it passes inspection, the switch SW-1 (FIG. 13) may be manually actuated by the inspector or another operator adjacent the receiving table, which closing of the switch SW-1 causes energization of timer motor A, which in turn energizes timer switches 1A and 2A. Energization of switch 1A causes energization of solenoid valve 154 and actuation of preferably hydraulic motor unit 98 to cause raising of the sterilizing cover 24 to the position illustrated in FIG. 6, and energization of timer switch 2A causes actuation of the solenoid valve 156 and thus actuation of the preferably hydraulic motor unit 96 to cause further raising of the cover 24 and thus raising of the gate mechanism 20 as aforedescribed.

When the gate and the cover 24 are in their raised position, then the timer motor A actuates the timer switch 3A, which energizes solenoid valve 158 which in turn controls the preferably hydraulic motor unit 78 (FIG. 1) thus causing movement of the receiving table 18 and its associated inspected and approved viscera to the right, as viewed in FIG. 1, and beneath the gate and cover 24 to the discharging station Y (FIG. 7), where flushing of the table and the viscera by means of the aforementioned spraying means 130, FIG. 7, can occur. Meanwhile the timer motor A, via timer switches 1A and 2A, actuates the solenoid valves 154, 156, and thus actuates the associated motor units 98, 96, thereby lowering the gate mechanism 20 and sterilizer cover 24 to the table surface, and as shown for instance in FIG. 9. Thereupon, the timer switch 4A actuated by the timer motor A, activates cold and hot water solenoid valves 160, 162 to apply cold and hot water to the spraying means 92 and 82a associated with respectively the cover and the gate mechanism 20.

As the hot and cold water are turned on by the solenoid valves 160, 162, the timer switch 3A as actuated by the timer motor A, causes energization of solenoid valve 158 and thus activation of the motor unit 78, causing return of the receiving table 18 to starting position. The hot and cold water sprays of the gate mechanism 20 and cover 24 remain on until the table has returned to its receiving position, or in other words the position illustrated in FIG. 1 of the drawings, thus flushing and sterilizing the table. After the table 18 has been returned to its receiving position by motor unit 78, the timer switch 1A is disengaged, thereby deenergizing solenoid valve 154, and causing the motor unit 98 to raise the sterilization cover 24 back up to the position illustrated in FIG. 6, thus completing the cycle.

However, if the viscera is condemned upon inspection thereof, the inspector or another operator may actuate switch SW-2 (FIG. 13). Actuation of switch SW-2 energizes the timer motor B which in turn energizes timer switch 1B, thereby energizing solenoid valve 154 and activating the motor unit 98 to lower the sterilization cover 24 to the receiving table surface, it being understood that the gate mechanism 20 is already in down position and is retained in such down position. Timer switch 2B is then engaged due to actuation by the timer motor B, thereby energizing the hot and cold water solenoid valves 160, 162, causing an application of the water spray of the gate mechanism 20 and of the sterilizing cover 24, both of which, as aforementioned, are in down position. Timer switch 3B is then engaged by the timer motor B, thus actuating solenoid valve 158, and causing actuation of the associated motor unit 78, which causes the receiving table to move toward discharge position on station Y, it being understood that the gate 20 and the cover 24 are still in down position.

As the receiving table moves toward the discharge position Y, the condemned viscera is manually discharged or moved by an operator into the condemned chute 22 for disposal (FIGS. 1 and 7). The receiving table 18 will automatically move to discharge position Y and then back to its receiving position (FIG. 2) due to actuation of the motor unit 78, and during which time or cycle it is being flushed and sterilized by the application of the hot and cold water sprays of the gate mechanism 20 and sterilizing cover mechanism 24.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

We claim:

1. A mechanism for use in eviscerating a slaughtered animal which is adapted for suspension from an overhead conveyor means comprising, a trolley frame, movable lengthwise with the movement of the conveyor means, a carriage mounted on said trolley frame and movable in a direction transverse of the trolley frame, a work platform supported on said carriage and adapted for movement vertically with respect to the carriage, means on said carriage for coupling the carriage and thus coupling the trolley frame to the conveyor means for moving the trolley frame and said carriage and said platform with the conveyor means, a receptacle means mounted on said platform and adapted to receive the viscera therein, fluid powered motor means for selectively moving said carriage transversely of said trolley frame and for moving said platform vertically with respect to said carriage, means for controlling the actuation of said fluid powered motor means, a receiving platform mounted adjacent said trolley frame and adapted to receive the viscera from said receptacle means, means for reciprocating said receiving platform in a generally horizontal plane, sterilizing means coacting with said receptacle means for sterilizing said receptacle means upon ejection of the viscera therefrom, said receptacle means being pivoted to said work platform, and fluid powered motor means for pivoting said receptacle means in a generally vertical plane with respect to said work platform.

2. A mechanism in accordance with claim 1 wherein said carriage is moved transversely of said trolley frame by means of a reciprocal double acting fluid powered motor unit, and pinion and rack means coacting between said carriage and said motor unit for moving said carriage transversely of said trolley frame upon actuation of said motor unit.

3. A mechanism in accordance with claim 2 wherein said pinion and rack means comprises, a rack stationarily mounted on said trolley frame and a rack coupled to said carriage and a pinion coacting between said racks.

4. A mechanism in accordance with claim 1, including a gate mechanism mounted immediately above said receiving platform, and means for actuating said gate mechanism in a generally vertical direction so as to raise and lower said gate mechanism with respect to said receiving platform.

5. A mechanism in accordance with claim 4 including cover means mounted above said gate mechanism and adapted for vertical movement with respect to said gate mechanism, said cover means when in lowered position being adapted to generally encompass said gate mechanism, and means for applying sterilization fluid to said gate mechanism and to said cover means.

6. A mechanism in accordance with claim 5 including means for raising and lowering said gate mechanism and said cover means, said raising and lowering means comprising, a pair of double acting fluid powered motor units, drum means mounted above said cover means and gate mechanism, said drum means including a smaller sized drum and a larger sized drum, flexible means connecting one of said motor units to said smaller sized drum and adapted to be reeved about said smaller sized drum, and other flexible means connecting said larger size drum to said cover means, actuation of one of said motor units causing raising of said cover means to a predetermined point above said gate mechanism, and actuation of the other of said motor units causing further raising of said cover means, and means coacting between said cover means and said gate mechanism to raise said gate mechanism upon said further raising of said cover means.

7. A mechanism in accordance with claim 4 including sterilization means associated with said gate mechanism for applying sterilization fluid to said gate mechanism and to said receiving platform.

8. An inspection platform for receiving viscera thereon, support means mounting said inspection platform for generally horizontal reciprocal movement, power means for actuating said platform for said generally horizontal movement, a gate mechanism mounted above said platform, and when in lowered position, being adapted to prevent movement of viscera past said gate mechanism upon horizontal movement of said platform, and means for applying a sterilizing fluid to said gate mechanism and to said platform.

9. An inspection platform in accordance with claim 8 including means coupled to said support means adjacent said movable platform for receiving therein viscera that has been condemned.

10. An inspection platform in accordance with claim 8 wherein said gate mechanism comprises a transversely extending plate-like member, fluid spraying means mounted on said plate-like member, a movable cover member disposed above said gate mechanism and adapted when in a lowered position to encompass said plate-like member, fluid spraying means coupled to said cover member for applying fluid to said plate-like member when said cover member is in said lowered position, and means for raising and lowering said cover member and said gate mechanism with respect to said inspection platform.

11. An inspection platform in accordance with claim 10 wherein said means for raising and lowering said gate mechanism and said cover member comprises, a plurality of drum means mounted above said gate mechanism and said cover member, certain of said drum means being of smaller diameter than other of said drum means, flexible means coupling said larger diameter drum means to said cover member, a pair of fluid powered reciprocal motor units coupled in end to end relation, flexible means coupling said smaller diameter drum means to one of said motor units, the other of said motor units being coupled to a support, and means coacting between said gate mechanism and said cover member adapted for raising said gate mechanism upon predetermined upward movement of said cover member, actuation of one of said motor units causing movement of said cover member to a predetermined position above said gate mechanism and actuation of the other of said motor units causing further upward movement of said cover member away from said inspection platform and coincident upward movement of said gate mechanism with respect to said platform.

12. A mechanism for use in eviscerating a slaughtered animal which is adapted for suspension on an overhead conveyor system for transfer movement of the animal and for inspecting the viscera of said animal comprising, a trolley frame mounted for lengthwise movement on stationary track means, a carriage mounted for movement transversely of said trolley frame and suspended therefrom, a work platform supported on said carriage and movably mounted for vertical movement with respect to said carriage, means extending from said carriage and adapted for coaction with the animal conveyor system for moving the trolley frame and the carriage and the work platform with movement of the animal, a viscera receptacle pivoted to said platform, fluid powered motor means for pivoting said receptacle with respect to said platform, a receiving table mounted adjacent said trolley frame and being adapted to receive the viscera from said receptacle in the elevated position of said platform, means for reciprocating said table in a generally horizontal plane and in a direction transverse of the movement of the trolley frame, gate means disposed above said table and adapted in the lowered position of said gate means to prevent movement of the viscera past said gate means during movement of said table, and sterilizing means coupled to said gate means for sterilizing and cleansing the table during reciprocation thereof from a receiving position to a discharge position and back to a receiving position.

13. An inspection mechanism for receiving viscera thereon, support means mounting said mechanism for movement, means for actuating said mechanism for said movement, gate means mounted on said inspection mechanism and when in predetermined position being adapted to prevent movement of viscera past said gate means upon movement of said inspection mechanism, and means for sterilizing said inspection mechanism.

14. An inspection mechanism in accordance with claim 13 wherein said inspection mechanism is mounted on said support means for generally longitudinal movement, said gate means being disposed above said inspection mechanism and when in lowered position being adapted to prevent said movement of the viscera past said gate means upon longitudinal movement of said inspection mechanism.

15. An apparatus for use in eviscerating a slaughtered animal which apparatus is adapted for movement with the animal as it is conveyed along in suspended relation from an overhead type conveyor system, said apparatus comprising a trolley frame mounted for lengthwise movement on a stationary track means, projection means extending outwardly from said trolley frame adapted for coacting engagement with a portion of said conveyor system which suspends said slaughtered animal for lengthwise movement of said trolley frame in the direction of movement of said slaughtered animal, a carriage suspended from said trolley frame and adapted for reciprocal movement relative to said trolley frame and in a direction toward and away from said slaughtered animal, fluid power means for actuating said carriage, said projecting means constituting a coupling for coupling said trolley frame to the conveyor system for moving said trolley frame and said carriage with movement of said conveyor system, a work platform for supporting workmen during the eviscerating operations mounted on said carriage for up and down movement vertically with respect to said carriage, and power means for actuating said work platform.

16. An apparatus in accordance with claim 15, including a viscera receptacle pivotally mounted on said platform, and fluid power means for pivoting said receptacle into an upended position.

17. An apparatus in accordance with claim 16, including a sterilizing hood disposed adjacent said receptacle and adapted to receive the same interiorly thereof in the upended position.

18. An apparatus in accordance with claim 16, including a receiving table mounted adjacent said trolley frame and being adapted to receive the viscera from said receptacle in an elevated position of said platform, and fluid power means for reciprocating said table in a generally horizontal plane and in a direction transverse relative to the movement of said trolley frame.

19. An apparatus in accordance with claim 15, including control means located on said work platform for controlling the vertical movement of said platform relative to said carriage.

References Cited by the Examiner
UNITED STATES PATENTS

| | | | |
|---|---|---|---|
| 1,365,708 | 1/1921 | Lundell | 17—24 |
| 1,413,673 | 4/1922 | Lundell | 17—24 |
| 2,590,291 | 3/1952 | Albright | 17—23 X |
| 2,789,310 | 4/1957 | Soss | 17—23 |
| 2,883,700 | 4/1959 | Liebmann | 17—24 |

LUCIE H. LAUDENSLAGER, *Primary Examiner.*

SAMUEL KOREN, *Examiner.*